United States Patent [19]
Boszor

[11] Patent Number: 5,624,512
[45] Date of Patent: Apr. 29, 1997

[54] METHOD OF CURING COMPOSITE ARTICLES USING CONFORMABLE VACUUM BAGS

[75] Inventor: Samuel M. Boszor, Palm Beach Gardens, Fla.

[73] Assignee: United Technologies Corporation, Hartford, Conn.

[21] Appl. No.: 955,959

[22] Filed: Oct. 2, 1992

[51] Int. Cl.$^6$ .................................................... B32B 31/00
[52] U.S. Cl. ........................... 756/87; 156/245; 156/285; 156/286; 427/294; 427/421; 264/257; 264/258
[58] Field of Search ..................... 427/294, 387, 427/421; 156/285, 286, 245, 87; 264/257, 258, 571

[56] References Cited

U.S. PATENT DOCUMENTS

| | | | |
|---|---|---|---|
| 4,421,581 | 12/1983 | Olsen | 427/421 |
| 4,684,423 | 8/1987 | Brooks | 156/156 |
| 4,775,554 | 10/1988 | Ponjee | 427/294 |
| 4,822,436 | 4/1989 | Callis et al. | 264/571 |
| 4,915,896 | 4/1990 | Rachel | 264/571 |

*Primary Examiner*—Benjamin Utech
*Attorney, Agent, or Firm*—Christopher T. Hayes

[57] ABSTRACT

A method of curing a lay-up of a composite article in an autoclave, the method including a silicone rubber sheet which conforms to the lay-up thus preventing bridging of the sheet and reducing the possibility of tearing of the sheet.

5 Claims, 4 Drawing Sheets

METHOD OF CURING COMPOSITE ARTICLES USING CONFORMABLE VACUUM BAGS

TECHNICAL FIELD

The present invention relates to the curing of composite articles, and particularly to articles that are cured in autoclaves.

BACKGROUND OF THE INVENTION

The goals of designers of both commercial and military aircraft include increasing fuel efficiency and performance. One way of obtaining both of these goals is to substitute lighter materials for the metal alloys that are used throughout the aircraft industry. Parts made from composite materials incorporating resins and fibers show great promise for reducing the weight of a given aircraft component while providing strength that is equal to or greater than the same part made of metal.

Unfortunately, present techniques for manufacturing composite articles that incorporate fibers are typically labor intensive, resulting in a cost-per-part that may be prohibitive for many aircraft applications. The "lay-up" for some composite parts must be done by hand, and for those parts which are to be cured in an autoclave the procedure for setting up the composite part for curing into the desired shape may be very complicated, depending on the shape of the part to be produced.

One prior art method of curing composite parts includes curing the parts in an autoclave. Because the material used in most autoclaves to provide the hydrostatic pressure will intrude into a lay-up at the temperatures and pressures required for curing, the part must be isolated from the hydrostatic material during the curing process. Typically, the part is isolated by sealing the composite lay-up in a polymer bag such as are commercially available and known in the industry. A vacuum is then drawn on the inside of the bag to evacuate any air from the bag along with any gasses that might have been given off by the composite material. Lay-ups with complex shapes, such as where a flange meets the surface of a cylinder, are difficult to bag and seal. When a vacuum is drawn on the inside of the bag, a portion of the bag may end up bridging from the flange to the cylinder without laying up flush to the fillet where the cylinder and flange meet. As the vacuum increases, that portion of the bag must either stretch or break.

If the bag tears while the vacuum is being drawn, the lay-up must be removed from the damaged bag and sealed inside a new bag and the procedure repeated. If the bag merely stretches, it may tear at the high pressure and temperature of the autoclave curing process. If this occurs, the hydrostatic material of the autoclave intrudes into the lay-up and ruins it, thereby reducing overall yield.

To prevent the polymer bag from bridging while the vacuum is being drawn, pleats are folded into the bag at those locations where the likelihood of bridging is high. On a part having many complex features, this may require a great deal of labor in folding, adjusting, and refolding the bag to ensure that adequate material is present to allow the bag to lay flush on the part after being subjected to a vacuum, without tearing. Thus, the labor cost associated with preparing the polymer bag is significant, and requires the efforts of a skilled technician.

What is needed is a method of isolating the lay-ups of complex shapes that is less labor intensive and less susceptible to tearing during autoclave curing than the polymer bag method of the prior art, yet effectively isolates the lay-up from the hydrostatic material of the autoclave.

SUMMARY OF THE INVENTION

It is therefore an object of the present invention to provide a method of curing a lay-up of a composite article in an autoclave, which method does not require use of the bag of the prior art.

According to the present invention, a lay-up of a composite article is cured in an autoclave after first forming a silicone sheet about a reference object having dimensions essentially the same as the article to be produced. The silicone is cured, and the reference object produces an impression on the sheet which conforms to a surface of the lay-up. When the edges of the sheet are sealed to the tooling, the sheet and tooling provide an envelope about the lay-up. The envelope is evacuated, and the tooling, lay-up and sheet are placed into an autoclave and the lay-up is cured.

The foregoing and other features and advantages of the present invention will become more apparent from the following description and accompanying drawings.

PREFERRED EMBODIMENT OF THE PRESENT INVENTION

Figure 1:
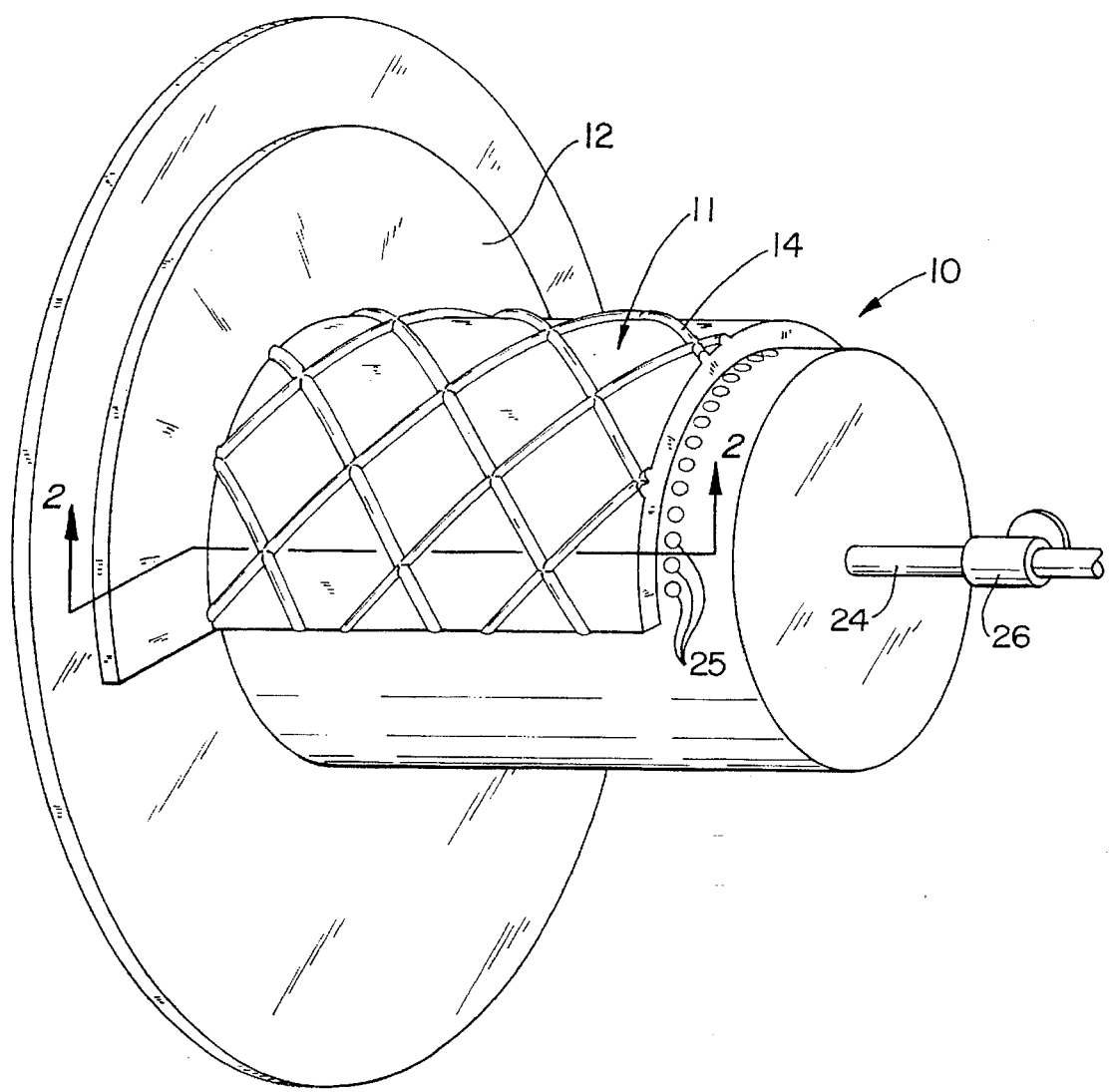
FIG. 1 is an isometric view of the reference object.

A reference object 10 having a complex surface 11 is shown in FIG. 1. As used herein, the term "complex surface" means a single surface that is neither entirely planar nor cylindrical, but may include both planar and cylindrical surfaces within that single surface. For example, the complex surface of the reference object shown in FIG. 1 includes a planar surface 12 integral with a substantially cylindrical surface 13, with a portion of the substantially cylindrical surface 13 having a grid pattern 14 protruding therefrom. The complex surface 11 of the reference object 10 is essentially identical to the surface that is desired to be produced on a composite article, as discussed below.

In practicing the method of the present invention, a coating of silicone rubber 15 is applied to the complex surface 11 of the reference object 10 and allowed to cure. As used herein, the term "silicone rubber" means one of the silicone based polymers having rubber-like characteristics and typically identified commercially simply as "silicone". To prevent the silicone rubber from bonding to the complex surface 11 of the reference object 10, a releasing material such as a heat shrinkable plastic film is applied to the complex surface 11 of the reference object 10 prior to the coating 15 thereof with the silicone rubber. Such film, which is commercially available and is sold as "heat shrinkable plastic", is applied over the entire complex surface 11 of the reference object 10 and secured thereto. Any air between the complex surface 11 and the plastic film is evacuated, and heat is applied to the film to remove any wrinkles that may have occurred in the film when the air was evacuated, resulting in a film that conforms to the complex surface 11 of the reference article 10.

Figure 2:
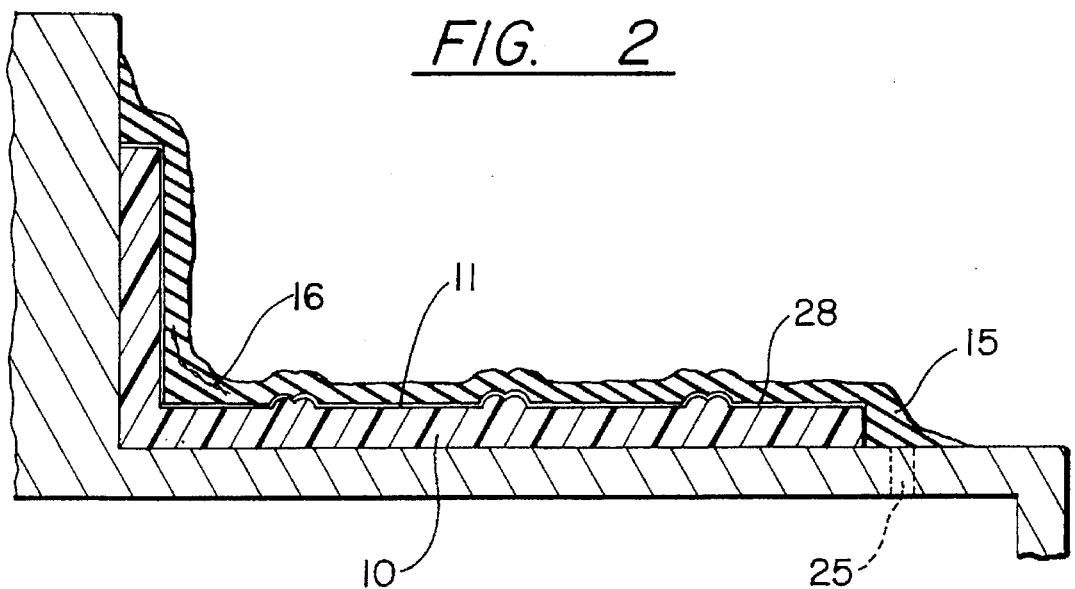
FIG. 2 is a cross-sectional view taken along line 2—2 of FIG. 1 showing the reference object with the layer of silicone rubber applied.
Figure 3:
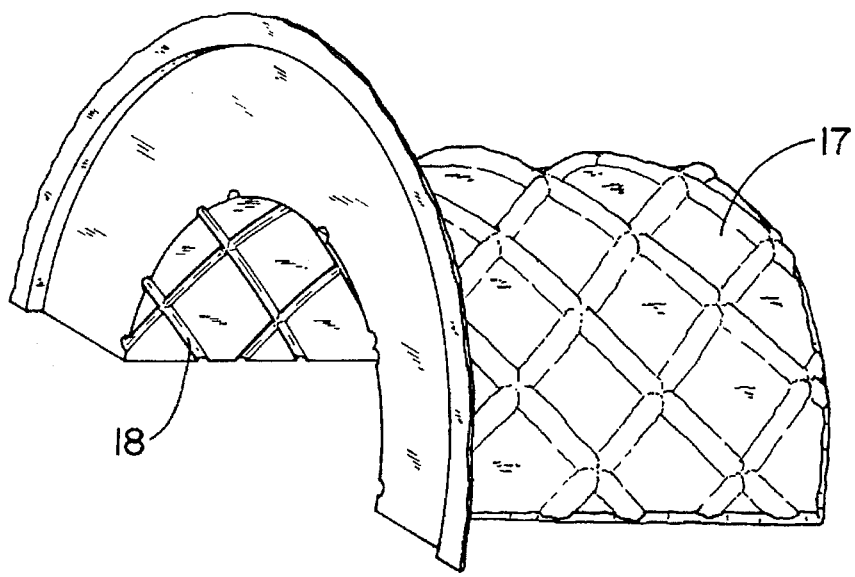
FIG. 3 is an isometric view of the silicone rubber sheet.

The silicone rubber is preferably applied by spraying the silicone rubber in layers onto the film on the complex surface 11 of the reference object 10, and may be sprayed robotically for production purposes to reduce labor costs. In some applications, it may be desirable to strengthen the silicone rubber with reinforcement material, such as glass cloth 16, as shown in FIG. 2, to ensure that the silicone rubber does not tear when subjected to a vacuum as discussed below. For those applications, after one or more layers of silicone rubber have been sprayed onto the film 28 on the complex surface 11 of the reference object 10, a layer of glass cloth 16 is laid onto the areas of the silicone rubber where additional strength is desired, preferably before the layer(s) of silicone rubber have cured and are thus still tacky. Then, one or more additional layers of silicone rubber are sprayed onto the glass cloth 16 to ensure that silicone rubber and the glass cloth 16 bond into a single sheet 17, as shown in FIG. 3. The silicone rubber is then cured into a solid, flexible sheet 17, thereby creating an impression 18 of the complex surface 11 in the sheet 17. This sheet 17 is then removed as a single piece from the film 28 on the complex surface 11 of the reference object 10.

Figure 4:
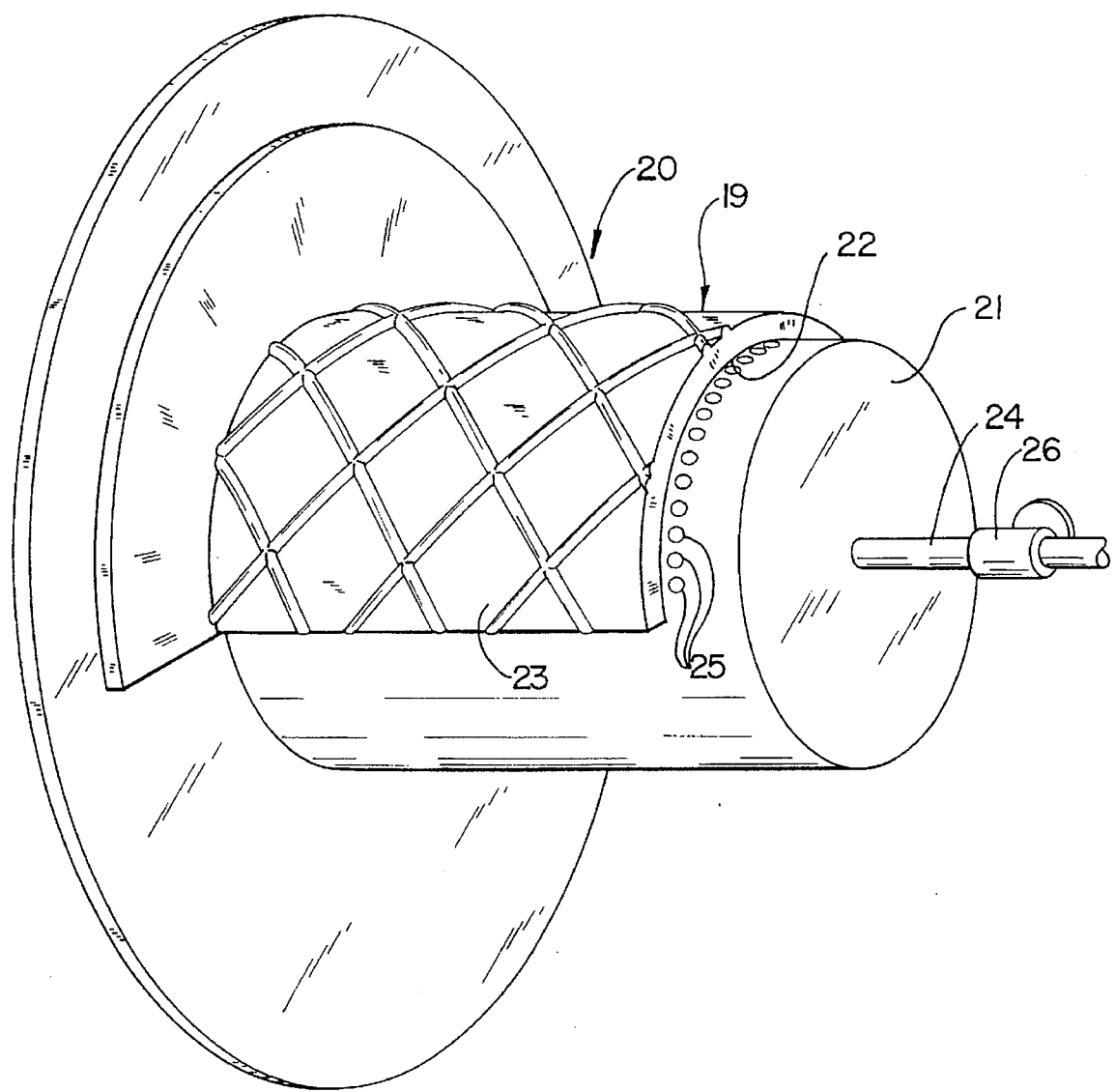
FIG. 4 is an isometric view of the lay-up on the tooling.
Figure 5:
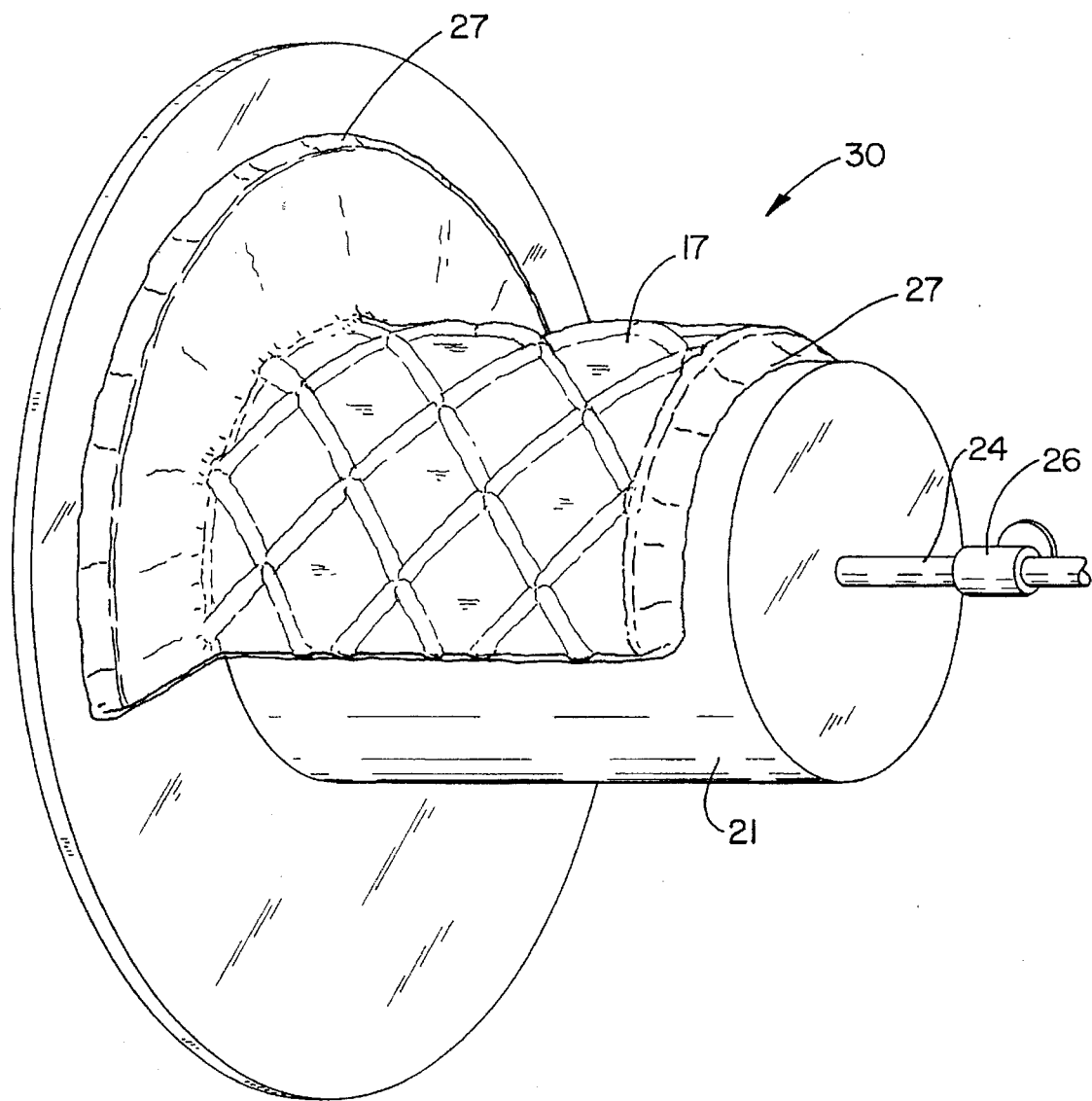
FIG. 5 is an isometric view of the autoclavable assembly of the present invention.

The lay-up 19 of the article 20 to be cured in the autoclave, shown in FIG. 4, is prepared in a manner known in the art. As used herein, the term "lay-up" refers to a workpiece made of one or more materials which has been formed into a shape having dimensions nearly the same as the article to be produced from that workpiece. The lay-up 19 is assembled on tooling 21 such that one surface 22 of the lay-up 19 conforms to the tooling 21 and is directly supported thereby. This surface 22 of the lay-up 19 is referred to herein as the supportive surface 22. The surface of the lay-up opposite the supportive surface is referred to herein as the compressive surface 23. The compressive surface 23 of the lay-up 19 is substantially similar to the complex surface 11 of the reference object 10, and therefore, substantially the inverse of the impression 18 in the sheet 17. The tooling 21 includes a vacuum line 24 therein, and one end of the vacuum line communicates with the surface of the tooling 21 adjacent the lay-up 19 through manifolded parts 25. The vacuum line 24 includes an exhaust valve 26 for the purpose described below.

The sheet 17 of cured silicone rubber is placed onto the compressive surface 23 such that the impression 18 on the sheet 17 conforms to the features of the compressive surface 23. The edges 27 of the sheet 17 are then sealed to the tooling 21, preferably with silicone rubber, so that the lay-up 19 is sandwiched between the tooling 21 and the sheet 17. The tooling 21 and the sheet 17 thus form a sealed envelope about the article, wherein the inside of the envelope communicates with the outside of the envelope solely through the vacuum line 24.

A vacuum is drawn on the vacuum line 24 with the exhaust valve 26 open, thereby evacuating the gases (including atmospheric gases and any volatiles which may have escaped from the lay-up 19) from the envelope generally and in particular from between the sheet 17 and the compressive surface 23. Once the gases have been evacuated, the exhaust valve 26 is closed, thereby isolating the lay-up 19. The tooling 21, sheet 17 and lay-up 19, which collectively comprise an autoclavable assembly 30, are then placed into an autoclave and subjected to the pressure and temperature necessary to cure the lay-up 19 into the desired composite article. Once the lay-up 19 has cured, the autoclavable assembly 30 is removed from the autoclave, and the desired composite article is separated from the sheet 17 and the tooling 21.

Although the method of the present invention is disclosed as using a reference object 10 to provide the impression of the complex surface 11, those skilled in the art will readily appreciate that the film 28 of releasing material can be applied directly to the compressive surface 23 and sealed to the tooling 21, and the gases evacuated through the tooling 21 as described above. Heat can then be applied to the film 28 of releasing material to remove any wrinkles, the amount of heat applied being only that which is necessary to shrink the film 28, not enough to affect the lay-up 19. Once wrinkles have been removed from the film 28, the film is coated with silicone rubber in the same manner as described above for the complex surface 11 of the reference object 10. The silicone rubber is then cured into a sheet, and the tooling 21, sheet 17 and lay-up 19, are placed as an assembly into an autoclave and subjected to the pressure and temperature necessary to cure the lay-up 19 into the desired composite article. Once the lay-up 19 has cured, the assembly is removed from the autoclave, and the sheet 17 and film 28 are removed from the desired composite article, which is then separated from the tooling 21.

As those skilled in the art will readily appreciate, the present invention obviates the problem of tearing of the polymer bag by replacing the bag with a silicone rubber sheet 17 that conforms to the shape of the composite article. The conforming silicone rubber sheet 17 is less likely to bridge the features of the lay-up 19 than are the generic polymer bags, and in those instances where bridging is likely to occur, the glass cloth 16 can be incorporated to reinforce the sheet 17 to prevent tearing. The present invention reduces production costs of composite articles having complex surfaces by eliminating the labor intensive "bagging" of the lay-up 19 and by increasing yield through elimination of the polymer bag which was subject to tearing.

Although this invention has been shown and described with respect to detailed embodiments thereof, it will be understood by those skilled in the art that various changes in form and detail thereof may be made without departing from the spirit and scope of the claimed invention.

I claim:

1. A method of curing a lay-up of a composite article in an autoclave, said method comprising:

face positioning said lay-up onto tooling supporting said lay-upon a first surface thereof;

coating a second surface of the lay-up with a releasing material;

applying a coat of silicone rubber to erasing material on said second surface;

curing said silicone rubber into a flexible sheet on the releasing material on said second surface, thereby creating an impression of the second surface in the sheet;

sealing all edges of the sheet to the tooling, said tooling and said sheet thereby forming a envelope about the lay-up, said tooling, sheet and lay-up comprising an assembly;

evacuating any gases from within the envelope to provide a vacuum therein; and, placing said assembly into said autoclave and subjecting said lay-up to a pressure and temperature at which the lay-up cures.

2. The method of claim 1 wherein the tooling includes means for evacuating said gases from said envelope.

3. The method of claim 2 wherein the step of applying a coat of silicone rubber to the releasing material on said second surface includes applying a first layer of silicone rubber to the releasing material on the second surface, laying reinforcing fibers onto said first layer, and applying a second layer of silicone rubber over the first layer and the fibers thereon.

4. The method of claim 3 wherein the reinforcing fibers are made of glass.

5. The method of claim 4 wherein the step of applying a coat of silicone rubber to the releasing material on said second surface is accomplished by spraying said silicone rubber onto the releasing material on said second surface.

* * * * *

UNITED STATES PATENT AND TRADEMARK OFFICE
CERTIFICATE OF CORRECTION

PATENT NO.   : 5,624,512
DATED        : April 29, 1997
INVENTOR(S)  : Samuel M. Boszor It is certified that error appears in the above-indentified patent and that said Letters Patent is hereby corrected as shown below:

In line 3 of claim 1, delete "face".
In line 4 of claim 1, change "lay-upon" to --lay-up on--.
In line 7 of claim 1, change "erasing" to --releasing--.

Signed and Sealed this

Thirty-first Day of March, 1998

Attest:

BRUCE LEHMAN

Attesting Officer        Commissioner of Patents and Trademarks